United States Patent Office 3,152,967
Patented Oct. 13, 1964

3,152,967
PROCESS FOR PREPARING GUANYLIC ACID
Hideo Katagiri, Jodoji, Sakyo-ku, Kyoto-shi, Kyoto-fu, Japan, Hideaki Yamada, Honolulu, Hawaii, and Hiroshi Iizuka, Tokyo, Koji Mitsugi, Kawasaki-shi, Kanagawa-ken, and Shinichi Motozaki, Masahiro Takahashi, and Kazuo Komagata, Tokyo, Japan, assignors to Ajinomoto Kabushiki Kaisha, Tokyo, Japan, a corporation of Japan
No Drawing. Filed Mar. 23, 1962, Ser. No. 182,089
Claims priority, application Japan, Mar. 27, 1961, 36/10,030; Jan. 18, 1962
16 Claims. (Cl. 195—28)

The present invention relates to a process for preparing guanylic acid by biochemically phosphorylating guanosine by the use of bacetria. A primary object of the invention resides in the provision of a biochemical synthesis of 5'-guanylic acid with various advantages and at a high yield on an industrial scale.

Since sodium 5'-guanylate was found to have merit as a flavoring material, various publications have disclosed methods of producing this substance. Most publications, however, suggest extraction or decomposition and extraction of said substance from raw materials containing ribo-nucleic acid, and no industrial process has so far been established on the basis of chemical or biochemical synthesis.

We have discovered that 5'-guanylic acid may be produced from guanosine, i.e. the precursor of guanylic acid, and proper phosphate donors through the action of microorganisms, and particularly bacteria belonging to the genera Flavobacterium, Serratia, Staphylococcus, and Pseudomonas that transfer the phosphate radical of the phosphate donor to the 5'-position of the ribose radical of guanosine which is also called 2-amino-6-hydroxypurine nucleoside. Thereby 2-amino-6-hydroxypurine nucleoside 5'-monophosphate (i.e. 5'-guanylic acid) is synthesized as a final product.

The process for producing 5'-guanylic acid according to the present invention has the following advantages:

(1) The main starting material is guanosine which is readily made available at a low price by chemical synthesis, fermentation process or extraction, (2) Unlike the chemical phosphorylating method, phosphorylation of guanosine by bacteria can be completed in one step in which guanosine is turned into guanylic acid.

(3) The microorganisms used as enzyme sources are available cheaply and amply.

(4) By setting up suitable conditions, the rate of producing and accumulating 5'-guanylic acid may be easily enhanced.

The microorganisms applicable for the process of the invention include, as noted above, the bacteria belonging to the genera Serratia, Flavobacterium, Pseudomonas and Staphylococcus, which are easily isolated from their natural fields and which are capable of biochemical phosphorylation and specifically producing 5'-guanylic acid from guanosine. We have discovered that guanosine can be turned into either 2'- or 3'-guanylic acid or 5'-guanylic acid through biochemical phosphorylation by micro-organisms. The above mentioned bacteria, however, are specifically capable of producing and accumulating only 5'-guanylic acid (though Staphylococcus are exceptional; i.e. they produce small amount of 3'-(2')-guanylic acid as by-products). The representative strains being usable for this invention are as follows: Serratia marcescens, Flavobacterium fuscum, Flavobacterium harrisonii, Flavobacterium sulfureum, Flavobacterium flavescens, Pseudomonas trifolii, Pseudomonas perlurida, Pseudomonas melanogenum, Staphylococcus aureus, Staphylococcus citreus and the like.

Strict comparison was bacteriologically carried out with respect to Pseudomonas melanogenum which is a novel species discovered by us for the first time with "Bergey's Determinative Bacteriology" and it was found that there was no description of any bacteria which could be identified with said Pseudomonas melanogenum. It was regarded as a new species and was duly named. It is identified below:

Characteristics of Pseudomonas melanogenum nov. species

Rod, 0.6 to 0.8 by 1.4 to 2.0 microns, occurring singly. Motile with a polar flagellum. Gram negative.

Nutrient agar colonies: Circular, smooth, entire to lobate, raised, translucent, pale yellowish gray, butyrous.

Nutrient agar slant: Moderate growth, filiform, glistening, translucent, light yellow. Medium becoming dark brown (nutrient agar containing 0.1% tyrosine becoming dark brown faster).

Glutamate agar slant: No growth.
Potato agar slant: Scanty growth.
Nutrient broth: Pellicle, strong turbidic.
Nutrient gelatin stab: Stratiform liquefaction.
Potato plug: Moderate growth, pale yellow.
Milk: Peptonized.
Litmus milk: Alkaline, peptonized, litmus reduced.
B.C.P. milk: Alkaline, peptonized.
Nitrate reduced to nitrite in nitrate broth and succinate nitrate.
Anaerobical growth with nitrate: Negative.
Indole not formed.
Hydrogen sulfide abundantly formed.
Starch not hydrolyzed.
Acetylmethyl carbinol not formed.
No acid or no gas from glycerol, xylose, glucose, sucrose, lactose, and starch in peptone media and synthetic media.
Anaerobically no acid or no gas from glucose and lactose.
2-ketogluconate not formed from gluconate.
Did not assimilate glucose, gluconate, 2-ketogluconate, 5-ketogluconate, citrate, succinate, ethanol, phenol, benzoate, salicylate, m-hydroxybenzoate, p-hydroxybenzoate, protocatechuate, gentisate, anthranilate and p-aminobenzoate with ammonical nitrogen.
Cellulose, did not attack.
Non-water-soluble yellow pigments formed.
Catalase: Positive.
Optimum temperature: 25° C. to 30° C. No growth at 37° C. and 42° C.
Habitat: Soil.

The microorganisms cited above are prepared by submerged culture, stationary culture or surface culture at temperatures of from 20 to 37° C. for 10 to 50 hours in a cluture medium containing suitable amounts of organic or inorganic nitrogen sources such as peptone, meat extract, corn-steep liquor, yeast extract, dry yeast, hydrolyzate of soybean meal, soybean meal extract and inorganic ammonium salts, and carbon sources such as molasses, glucose, hydrolyzate of starches and inorganic salts. Then the cultured bacteria are added to the phosphorylating reaction mixture in the form as cultured, or as a living cell suspension, or as treated cells such as dried cells, acetone powder, etc., or as crude extracts or enzyme preparation. It is also possible to effect phosphorylation by adding the required raw materials to the cultured cells in one of said forms.

Guanosine, the starting material of the process according to the present invention may have been synthesized chemically, or extracted from organisms, or else produced by fermentation process. When those substances that may prevent the enzyme reaction are eliminated, any form of guanosine is usable: i.e. readily applicable are crystalline guanosine, crude guanosine crystals, or the culture medium containing guanosine.

When the guanosine product by fermentation process is to be applied, the reaction should be conducted in the following way: before proceeding with the reaction, a proper amount of either copper salt or zinc salt which are capable of promoting the reaction as cited hereafter should be added, and the insoluble protein that are precipitated by said salts and the cells should be removed, and then to the remaining solution containing guanosine are added the enzyme solution of said bacteria and phosphate donor. However, removing said precipitates is not required under certain conditions. When such nucleosides as inosine and adenosine exist concurrently with guanosine in the solution, corresponding 5'-nucleotides are produced as by-products, but their existence has no effect on the production of 5'-guanylic acid.

The phosphate donors applied in accordance with the process of the invention includes phosphate compounds from natural sources and also synthetic organic phosphates are useable for phosphate transfer by said microorganisms. They include 5'-mononucleotides such as 5'-adenylic acid, 5'-cytidylic acid and 5'-uridylic acid, and aromatic phosphates such as p-nitrophenylphosphate o-nitrophenylphosphate, phenylphosphate, benzylphosphate, etc. These phosphate compounds are usable either in the form of crystalline neutral salts, or in the form of solution, unless it prevents the expected reaction. Of the above, said phosphate compounds p-nitrophenylphosphate, which had never been heretofore used in nucleoside phosphate transfer reactions, is the most efficient donor.

As a result of our investigations, it has been found that production and accumulation of 5'-guanylic acid was promoted by adding copper salts or zinc salts in suitable quantity to the reaction mixture, of which the pH value was kept as close as possible to acidity. Namely, a pH value about 3.5 to 4.5 brings about the best production and accumulation of 5'-guanylic acid, and when $10^{-5}$ to $10^{-1}$ mole, preferably $10^{-3}$ to $10^{-2}$ mole of copper salts or of zinc salts exist in the solution, the production and accumulation of 5'-guanylic acid can be greatly increased. When these metal salts are used to treat a culture medium containing guanosine, however, their concentrations should be a little higher than said limit. Chlorides or sulfates of copper or zinc salts are preferred, although others that contain said metals may be used for the process. The combination effects of pH values and said metal salts are shown in Table 1 where the molar yield of 5'-guanylic acid amounted to a maximum of 80% or more under optimal conditions based on the guanosine charged.

The temperature condition for the process matters little and need only keep the enzyme activity going, but preferably it should be near 37° C.

The duration of incubation differs depending on the various conditions to be selected. It is evident, however, that it should be continued until the expected reaction reaches a maximum unless the decomposition of accumulated 5'-guanylic acid begins. During incubation, stirring is desirable for better contact of the enzyme source with the raw materials.

TABLE 1

[Effects of pH and copper sulfate]

| pH | Copper sulfate | | | | | |
|---|---|---|---|---|---|---|
| | None | | | 24.9 mg./dl. | | |
| | 5'-guanylic acid produced (g./dl.) | Residual guanosine (g./dl.) | p-nitrophenol liberated (g./dl.) | 5'-guanylic acid produced (g./dl.) | Residual guanosine (g./dl.) | p-nitrophenol liberated (g./dl.) |
| 7.0 | 0.011 | 0.150 | 0.86 | 0.033 | 0.119 | 0.52 |
| 6.0 | 0.025 | 0.110 | 0.67 | 0.036 | 0.179 | 0.47 |
| 5.0 | 0.047 | 0.107 | 0.61 | 0.069 | 0.252 | 0.43 |
| 4.0 | 0.145 | 0.192 | 0.29 | 0.200 | 0.153 | 0.52 |
| 3.5 | 0.149 | 0.192 | 0.31 | 0.210 | 0.164 | 0.50 |

The reactions described in Table 1 were carried out by adding a cell suspension of a strain of genus Flavobacterium, equivalent to 100 mg. of the cells as dry matter, to a reaction mixture containing 0.28 g. of guanosine and 2.6 g. of sodium p-nitrophosphate per 100 ml., and incubating the reaction mixture at various pH's and at 37° C. for 24 hours.

5'-guanylic acid which is produced and accumulated according to this invention may be isolated by any of conventional methods such as, for example, by various kinds of combination of ion exchange resin techniques, solvent extraction techniques and precipitation techniques. Taking the case of using nitrophenylphosphate as the phosphate donor, 5'-guanylic acid is isolated by separating the cells from the reaction mixture, extracting the liquid with an organic solvent such as toluene, ethyl acetate, butanols and the like to remove the nitrophenylphosphate and nitrophenol, recovering the 5'-guanylic acid fraction with an anion exchange resin, neutralizing and concentrating the liquid containing 5'-guanylic acid and adding ethyl alcohol to deposit the crystalline sodium 5'-guanylate.

The following examples are given by way of more detailed explanation of the process of this invention, and should not be construed as imposing any limitation thereon.

*Example 1*

A cell suspension of *Flavobacterium harrisonii* No. 1161 (ATCC 14589), equivalent to 85 mg. per ml. of the cells as dry matter, was prepared by aerobically culturing the bacterium at 30° C. for 16 hours in a medium containing 1 g. of glucose, 2.4 ml. of acid hydrolysate of soybean meal, 0.3 g. of $KH_2PO_4$, 0.1 g. of $MgSO_4 \cdot 7H_2O$ and 1 g. of $CaCO_3$ per 100 ml. at a pH 7.5.

The reaction was carried out by preparing 975 ml. of reaction mixture containing 5.7 g. of guanosine, 26 g. of sodium p-nitrophenylphosphate and 249 mg. of copper sulfate, adjusting it to a pH value of 4.0, adding 25 ml. of the cell suspension obtained as described above and incubating this reaction mixture at 37° C. for 25 hours.

At the end of this reaction, 0.566 g. of 5'-guanylic acid was produced and accumulated per 100 ml., which corresponded to a molar yield of 78% based on guanosine, and 0.11 g. of guanosine remained unreacted per 100 ml. The rate of decomposition of p-nitrophenylphosphate corresponded to 94%.

5.4 g. of crude crystals of sodium 5'-guanylate were obtained with the following steps: by centrifuging the cells from the reaction mixture, extracting and removing the liberated p-nitrophenol with benzene from the supernatant, passing the resulting solution through a column of anion-exchange resin Dowex–1X8 (chloride ion type) of inside diameter 2 cm. and length 30 cm., washing the column with water, eluting 5'-guanylic acid with 250 ml. of mixture of 0.01 N hydrochloric acid and 0.1 N sodium chloride, neutralizing and concentrating the eluate and adding ethanol to the solution.

Example 2

A cell suspension of *Flavobacterium harrisonii* No. 1161 (ATCC 14589), equivalent to 45 mg. per ml. of the cells as dry matter, was prepared by culturing the bacteria under the same conditions as those of Example 1.

The reaction was carried out by preparing 950 ml. of reaction mixture containing 2.8 g. of guanosine, 26 g. of sodium p-nitrophenylphosphate and 287 mg. of zinc sulfate, adjusting it to a pH value of 4.0, adding 50 ml. of the cell suspension obtained as described above and incubating the mixture at 37° C. for 23 hours.

At the end of this reaction, 0.31 g. of 5'-guanylic acid was produced and accumulated per 100 ml., which corresponded to a molar yield of 84% based on guanosine charged, and 0.04 g. of guanosine remained unreacted. The rate of decomposition of p-nitrophenylphosphate corresponded to 60%.

3.25 g. of crude crystals of sodium 5'-guanylate were obtained by centrifuging the cells from the reaction mixture, adjusting the supernatant to a pH value of 1.0, extracting and removing the unreacted p-nitrophenylphosphate and the liberated p-nitrophenol with n-butanol saturated with water, adjusting the extract to a pH value of 4.0 and treating the solution through anion exchange resin in the manner described in Example 1.

Example 3

A cell suspension of the various kinds of bacteria described in the table below was prepared by aerobically culturing each of the bacteria in a medium containing 1 g. of peptone, 1 g. of meal extract, and 0.5 g. of NaCl at pH 7.5 and at 30° C. for 15 hours, and recovering the cells obtained.

The reaction was carried out by adding the cell suspension, equivalent to 250 mg. per 100 ml. of the cells as dry matter, as described above, to a reaction mixture containing 0.28 g. of guanosine, 1.8 g. of sodium p-nitrophenylphosphate and 24.9 mg. of copper sulfate per 100 ml., and incubating the mixture at pH 4.0 and at 37° C. for 24 hours.

The amounts of 5'-guanylic acid produced are given in table below.

TABLE

| Strains | Amount of 5'-guanylate produced (g./dl.) | Mole percent of guanosine added (percent) | Residual guanosine (g./dl.) | Utility of phosphate (percent)[2] |
|---|---|---|---|---|
| *Flavobacterium sulfureum* (ATCC 14232) | 0.12 | 32 | 0.19 | 35.0 |
| *Flavobacterium fuscum* (ATCC 14233) | 0.15 | 39 | 0.17 | 42.0 |
| *Flavobacterium flavescens* (ATCC 14231) | 0.16 | 42 | 0.16 | 33.0 |
| *Flavobacterium lactis* | 0.18 | 50 | 0.14 | 21.3 |
| *Flavobacterium breve* (ATCC 14234) | 0.02 | 7 | 0.23 | 5.4 |
| *Serratia marcescens* (ATCC 14227) | 0.20 | 56 | 0.12 | 23.4 |
| *Serratia marcescens* (ATCC 14225) | 0.26 | 71 | 0.10 | 22.8 |
| *Serratia marcescens* (ATCC 14223) | 0.28 | 76 | 0.09 | 26.2 |
| *Serratia marcescens* (ATCC 14226) | 0.25 | 69 | 0.10 | 22.6 |
| *Staphylococcus aureus* (ATCC 14222) | 0.21 [1](0.03) | 59.0 | 0.05 | 27.9 |
| *Staphylococcus citreus* (ATCC 4012) | 0.30 [1](0.03) | 82.0 | 0.04 | 29.0 |

[1] The values in the parentheses show the amount of 3'(2') guanylic acid as by-products.

[2] Utility of phosphate (percent)
$$= \frac{\text{Amounts of 5'-guanylic acid produced (moles)}}{\text{Amounts of p-nitrophenol liberated (moles)}} \times 100.$$

Example 4

*Flavobacterium flavescens* (ATCC 14231) was cultured in the same medium as that of Example 3 for 17 hours and the thus cell suspensions were prepared.

One portion of the cell suspension was dried under reduced pressure to give dried cells, and one portion was treated with acetone to give acetone powder.

The reaction was carried out by adding the cell suspension, dried cells or acetone powder as an enzyme source, to a reaction mixture containing 0.28 g. of guanosine, 2.6 g. of sodium p-nitrophenylphosphate and 24.9 mg. of copper sulfate, and incubating the reaction mixture at a pH of 4.0 and at 37° C. for 24 hours.

The amounts of 5'-guanylic acid produced are given in the table below:

| Enzyme source (250 mg./dl. as dry matter) | Amount of 5'-guanylic acid produced (g./dl.) | Molar yield 5'-guanylic acid based on the guanosine added (percent) |
|---|---|---|
| Cell suspension | 0.15 | 41.4 |
| Acetone powder | 0.11 | 30.3 |
| Dried cells | 0.13 | 35.8 |

Example 5

A cell suspension of *Pseudomonas trifolii* (ATCC 14537), equivalent to 95 mg. per ml. of the cells as dry matter was prepared by aerobically culturing the bacteria in a medium containing 2 g. of glucose, 10 ml. of acid hydrolysate of soybean meal, 0.3 g. of $KH_2PO_4$, 0.1 g. of $MgSO_4 \cdot 7H_2O$ and 1 g. of $CaCO_3$ at 30° C. for 24 hours.

The reaction was carried out by preparing 3.54 l. of a reaction mixture containing 10.5 g. of guanosine, 91 g. of sodium p-nitrophenylphosphate and 1 g. of zinc sulfate, adjusting it to a pH value of 4.0, adding thereto 60 ml. of the cell suspension obtained as described above and incubating the reaction mixture at 37° C. for 40 hours.

As a result of the reaction, there was produced and accumulated 0.36 g. of 5'-guanylic acid per 100 ml., which corresponded to a molar yield of 92.6% based on the guanosine added, and 0.02 g. of guanosine remained unreacted. The rate of decomposition of p-nitrophenylphosphate corresponded to 53%.

10.2 g. of sodium 5'-guanylate were isolated by centrifuging the cells from the reaction mixture, adjusting the supernatant to a pH value of 1.0 with hydrochloric acid, repeating the extraction of the solution with n-butanol saturated with water to remove the unreacted p-nitrophenylphosphate and the formed p-nitrophenyl, adjusting the extract solution to a pH value of 6.0 with NaOH, passing the solution through a 0.6 liter column of anion exchange resin Dowex–1X8 (chloride ion type), washing the column with water, eluting guanosine with 0.1 N hydrochloric acid, then eluting 5'-guanylic acid with a mixture of 0.1 Normal hydrochloric acid and 0.2 Normal sodium chloride, neutralizing and concentrating the fraction of 5'-guanylic acid and adding ethanol to deposit sodium 5'-guanylate.

Example 6

A cell suspension of *Pseudomonas perlurida* (ATCC 14536), equivalent to 85 mg. per ml. of the cells as dry matter, was prepared by aerobically culturing the bacteria in the same medium as that of Example 3 at 30° C. for 24 hours.

The reaction was carried out by preparing 980 ml. of a reaction mixture containing 2.8 g. of guanosine, 26 g. of sodium p-nitrophenylphosphate and 287 mg. of zinc sulfate, adjusting it to a pH value of 4.0, adding thereto 20 ml. of the cell suspension obtained as described above, and incubating the mixture at 35° C. for 19 hours.

There was produced and accumulated 0.298 g. of 5'-guanylic acid per 100 ml., which corresponded to the molar yield of 82% based on the guanosine added, and 0.07 g. of guanosine remained unreacted. The rate of decomposition of p-nitrophenylphosphate corresponded to 55%.

2.6 g. of the crude crystals of sodium 5'-guanylate were isolated in the manner described in Example 5.

Example 7

A cell suspension of *Pseudomonas perlurida* (ATCC 14536) was prepared in the same way as that of Example 6, and the reaction of Example 6 was repeated except that 249 mg. of copper sulfate were used instead of zinc sulfate.

There was produced and accumulated 0.26 g. of 5'-guanylic acid, which corresponded to a molar yield of 71.5% based on the guanosine added, and 0.07 g. of guanosine remained unreacted. The rate of decomposition of p-nitrophenylphosphate corresponded to 66.5%.

There were isolated 2.52 g. of crude crystals of sodium 5'-guanylate in the manner described in Example 5.

Example 8

A cell suspension of *Pseudomonas melanogenum* (ATCC 14535) was prepared by culturing the bacteria in the same manner as that of Example 6.

The reaction was carried out by preparing 95 ml. of the reaction mixture containing 0.28 g. of guanosine, 2.6 g. of sodium p-nitrophenylphosphate and 24.9 mg. of copper sulfate, adjusting it to a pH value of 4.0, adding thereto 5 ml. of the cell suspension obtained above (equivalent to 40 mg./ml. of the cells as dry matter) and incubating the mixture at 37° C. for 25 hours.

There was produced and accumulated 0.11 g. of 5'-guanylic acid per 100 ml., which corresponded to a molar yield of 30.2% based on guanosine added, and 0.17 g. of the guanosine remained unreacted per 100 ml. The rate of decomposition of p-nitrophenylphosphate corresponded to 45.6%.

There were isolated 105 mg. of crude crystals of 5'-guanylate in the same manner as that of Example 5.

Example 9

50 ml. of the cell suspension of *Pseudomonas trifolii* (ATCC 14537), equivalent to 58 mg. per ml. of the cells as dry matter, was prepared by culturing the bacteria in the same manner as that of Example 5.

The reaction was carried out by adding 38 g. of p-nitrophenylphosphate and 2.6 g. of zinc sulfate to 1.4 liter of the culture medium containing guanosine, adjusting it to a pH value of 4.0, adding thereto 50 ml. of the cell suspension obtained above, and incubating the reaction mixture at 37° C. for 29 hours.

The initial concentration of guanosine was 0.17 g./dl., and at the end of the reaction there was produced and accumulated 0.18 g. of 5'-guanylic acid per 100 ml.

The starting culture medium also contained inosine, and, therefore, 5'-inosinic acid was produced as a by-product according to this phosphorylating reaction.

2.3 g. of the crude crystals of 5'-guanylic acid were isolated by centrifuging the cells from the reaction mixture, extracting and removing the unreacted p-nitrophenylphosphate and the formed p-nitrophenol, passing the extract solution through a column of anion exchange resin, Dowex–1X4 (chlorine ion type), washing the column with water and 0.005 Normal hydrochloric acid successively, eluting a mixture of 5'-guanylic acid and 5'-inosinic acid with mixture of 0.1 Normal hydrochloric acid and 0.1 Normal sodium chloride, and, thereafter, treating the eluate in the same manner as that of Example 5.

Example 10

A cell suspension of *Pseudomonas trifolii* (ATCC 14537), equivalent to 85 mg./ml. of the cells as dry matter, was prepared by culturing the bacteria in the same manner as that of Example 6.

The reaction was carried out by preparing a reaction mixture containing 0.28 g. of guanosine, 1.29 g. of 5'-cytidylic acid and 28.7 mg. of zinc sulfate, adjusting it to a pH value of 4.0, adding thereto 2.3 ml. of the cell suspension obtained above to make the total volume 100 ml., and incubating the reaction mixture at 37° C. for 25 hours.

There was produced an accumulated 0.12 g. of 5'-guanylic acid per 100 ml., which corresponded to a molar yield of 33% based on guanosine added.

106 mg. of the crude crystals of sodium 5'-guanylate were obtained with the same treatment as in Example 5.

Example 11

Example 10 was repeated except 1.47 g. of 5'-uridylic acid was used instead of 5'-cytidylic acid.

There was produced and accumulated 0.16 g. of 5'-guanylic acid par 100 ml., which corresponded to a molar yield of 44.1% based on guanosine added.

140 mg. of the crude crystals of sodium 5'-guanylate were isolated by the same treatment as in Example 10.

Example 12

Example 10 was repeated except that 1.3 g. of barium benzylphosphate was used instead of 5'-cytidylic acid and that the incubation period was 24 hours.

There was produced and accumulated 0.11 g. of 5'-guanylic acid per 100 ml., and 98 mg. of the crude crystals of sodium 5'-guanylate were obtained by the same treatment as in Example 10.

What we claim is:

1. A process for producing 5'-guanylic acid comprising preparing an enzyme source, having a nucleoside phosphotransferase activity for producing substantially solely 5'-guanylic acid from guanosine and a phosphate donor from a micro-organism of a genus selected from the group consisting of Serratia, Flavobacterium, Pseudomonas, and Staphylococcus, combining the enzyme source with a solution containing guanosine and a phosphate donor to effect biochemical phosphorylation of the guanosine, and recovering the thusly formed 5'-guanylic acid.

2. A process for producing 5'-guanylic acid comprising preparing an enzyme source, having a nucleoside phosphotransferase activity for producing 5'-guanylic acid from guanosine and a phosphate donor, from a microorganism selected from the group consisting of *Flavobacterium flavescens, Fl. fuscum, Fl. sulfureum, Fl. breve, Fl. lactis, Fl. harrisonii, Serratia marcescens, Staphylococcus citreus, St. aureus, Pseudomonas trifolii, Ps. perlurdia,* and *Ps. melanogenum*, combining the enzyme source with a solution containing guanosine and a phosphate donor to effect biochemical phosphorylation of the guanosine, and recovering the thusly formed 5'-guanylic acid.

3. A process for producing 5'-guanylic acid comprising preparing from a microorganism of a genus selected from the group consisting of Serratia, Flavobacterium, Pseudomonas, and Staphylococcus an enzyme source, having a nucleoside phosphotransferase activity for producing substantially solely 5'-guanylic acid from guanosine and a phosphate donor, combining the enzyme source with a solution containing guanosine and a phosphate donor to effect biochemical phosphorylation of the guanosine, and recovering the thusly formed 5'-guanylic acid; the biochemical phosphorylation being effected in a pH range of about 3.5 to 7.0.

4. A process for producing 5'-guanylic acid comprising preparing from a microorganism of a genus selected from the group consisting of Serratia, Flavobacterium, Pseudomonas, and Staphylococcus an enzyme source, having a nucleoside phosphotransferase activity for producing substantially solely 5'-guanylic acid from guanosine and a phosphate donor, combining the enzyme source with a solution containing guanosine and a phosphate donor to effect biochemical phosphorylation of the guanosine, and recovering the thusly formed 5'-guanylic acid; the biochemical phosphorylation being effected in the presence of metal ions selected from the group consisting of copper and zinc ions.

5. A process for producing 5'-guanylic acid comprising preparing from a microorganism of a genus selected from the group consisting of Serratia, Flavobacterium, Pseudomonas, and Staphylococcus an enzyme source, having a nucleoside phosphotransferase activity for producing substantially solely 5'-guanylic acid from guanosine and a phosphate donor, combining the enzyme source with a solution containing guanosine and a phosphate donor to effect biochemical phosphorylation of the guanosine, and recovering the thusly formed 5'-guanylic acid; the phosphate donor being selected from the group consisting of 5'-mononucleotides and aromatic phosphates.

6. A process for producing 5'-guanylic acid comprising preparing from a microorganism of a genus selected from the group consisting of Serratia, Flavobacterium, Pseudomonas, and Staphylococcus an enzyme source, having a nucleoside phosphotransferase activity for producing substantially solely 5'-guanylic acid from guanosine and a phosphate donor, combining the enzyme source with a solution containing guanosine and a phosphate donor to effect biochemical phosphorylation of the guanosine, and recovering the thusly formed 5'-guanylic acid; said enzyme source being in the form of a cell suspension.

7. A process for producing 5'-guanylic acid comprising preparing from a microorganism of a genus selected from the group consisting of Serratia, Flavobacterium, Pseudomonas, and Staphylococcus an enzyme source, having a nucleoside phosphotransferase activity for producing substantially solely 5'-guanylic acid from guanosine and a phosphate donor, combining the enzyme source with a solution containing guanosine and a phosphate donor to effect biochemical phosphorylation of the guanosine, and recovering the thusly formed 5'-guanylic acid; said enzyme source being in the form of dried cells.

8. A process for producing 5'-guanylic acid comprising preparing from a microorganism of a genus selected from the group consisting of Serratia, Flavobacterium, Pseudomonas, and Staphylococcus an enzyme source, having a nucleoside phosphotransferase activity for producing substantially solely 5'-guanylic acid from guanosine and a phosphate donor, combining the enzyme source with a solution containing guanosine and a phosphate donor to effect biochemical phosphorylation of the guanosine, and recovering the thusly formed 5'-guanylic acid; said enzyme source being in the form of a crude extract.

9. A process for producing 5'-guanylic acid which comprises adding an enzyme source, having a nucleoside phosphotransferase activity for producing 5'-guanylic acid from guanosine and a phosphate donor, prepared from microorganisms selected from the group consisting of Flavobacterium flavescens, Fl. fuscum, Fl. sulfureum, Fl. breve, Fl. harrisonii, Serratia marcescens, Staphylococcus citreus, St. aureus, Pseudomonas trifolii, Ps. perlurida, and Ps. melanogenum to a solution containing guanosine and a phosphate donor selected from the group consisting of 5'-mononucleotides and aromatic phosphates biochemically phosphorylating the guanosine at a pH range of 3.5 to 7.0, and recovering the thusly formed 5'-guanylic acid.

10. A process for producing 5'-guanylic acid which comprises adding an enzyme source, having a nucleoside phosphotransferase activity for producing 5'-guanylic acid from guanosine and a phosphate donor, prepared from a microorganism selected from the group consisting of Flavobacterium flavescens, Fl. fuscum, Fl. sulfureum, Fl. breve, Fl. lactis, Fl. harrisonii, Serratia marcescens, Staphylococcus citreus, St. aureus, Pseudomonas trifolii, Ps. perlurida, Ps. melanogenum to a solution containing guanosine and a phosphate donor selected from the group consisting of 5'-mononucleotides and aromatic phosphates and metal ions selected from the group consisting of copper and zinc ions, biochemically phosphorylating the guanosine at a pH range of 3.5 to 7.0 and recovering the thusly formed 5'-guanylic acid.

11. A process as set forth in claim 9, wherein said microorganism is selected from the group consisting of Flavobacterium flavescens ATCC 14231, Fl. fuscum ATCC 14233, Fl. sulfureum ATCC 14232, Fl. breve ATCC 14234, Fl. harrisonii ATCC 14589, Serratia marcescens ATCC 14223, S. marcescens ATCC 14225, S. marcescens ATCC 14226, S. marcescens ATCC 14227, Staphylococcus citreus ATCC 4012, St. aureus ATCC 1422 Pseudomonas trifolii ATCC 14537, Ps. perlurida ATCC 14536, and Ps. melanogenum ATCC 14535.

12. A process as set forth in claim 10, wherein said microorganism is selected from the group consisting of Flavobacterium flavescens ATCC 14231, Fl. fuscum ATCC 14233, Fl. sulfureum ATCC 14232, Fl. breve ATCC 14234, Fl. harrisonii ATCC 14589, Serratia marcescens ATCC 14223, S. marcescens ATCC 14225, S. marcescens ATCC 14226, S. marcescens ATCC 14227, Staphylococcus citreus ATCC 4012, St. aureus ATCC 14222, Pseudomonas trifolii ATCC 14537, Ps. perlurida ATCC 14536, and Ps. melanogenum ATCC 14535.

13. A process as set forth in claim 9, wherein said phosphate donor is selected from the group consisting of p-nitrophenylphosphate, o-nitrophenylphosphate, phenylphosphate, benzyl phosphate, 5'-adenylic acid, 5'-cytidylic acid, 5'-uridylic acid and mixtures of said compounds.

14. A process as set forth in claim 10 wherein said phosphate donor is selected from the group consisting of p-nitrophenylphosphate, o-nitrophenylphosphate, phenylphosphate, benzyl phosphate, 5'-adenylic acid, 5'-cytidylic acid, 5'-uridylic acid and mixtures of said compounds.

15. A process as set forth in claim 9 wherein said phosphorylation is carried out at a pH range of 3.5–5.0.

16. A process as set forth in claim 10 wherein said phosphorylation is carried out at a pH range of 3.5–5.0.

References Cited in the file of this patent

UNITED STATES PATENTS

| 2,174,475 | Ostern | Sept. 26, 1939 |
| 2,844,514 | Morell et al. | June 22, 1958 |

OTHER REFERENCES

Journal of Biological Chemistry 235, 1474–1478 (I), 2103–2108 (II), 2672–2681 (III), 1960.